Patented Mar. 17, 1925.

1,529,649

UNITED STATES PATENT OFFICE.

ROBERT L. CORBY, OF NEW YORK, N. Y., ASSIGNOR TO THE FLEISCHMANN COMPANY, OF NEW YORK, N. Y., A CORPORATION OF OHIO.

PREPARATION AND TREATMENT OF BREAD DOUGH.

No Drawing. Application filed March 28, 1923. Serial No. 628,392.

*To all whom it may concern:*

Be it known that I, ROBERT L. CORBY, a citizen of the United States, and a resident of New York city, in the county and State of New York, have invented certain new and useful Improvements in the Preparation and Treatment of Bread Dough, of which the following is a specification.

This invention relates to the preparation and treatment of dough, and more particularly to the preparation and treatment of dough for the manufacture of bread, and has for its object generally to produce a bread loaf having good volume, crust and texture of crumb, in a manner which is more economical and convenient than heretofore.

More specifically an object of this invention is to provide an improved process for the manufacture of bread in such manner that the capacity of the machinery of any bakery is substantially increased and the cost of the production of the bread is reduced, both by the reduction of the time factor in the dough preparation and by the avoidance of the need of artificial refrigeration in the preparation of dough.

A further object of the invention is to provide a straight-dough process in which white flours of widely different compositions may be utilized without varying the procedure of carrying out the process, and without necessitating the analysis of the flour to determine the chemical characteristics thereof.

Other objects of the invention will in part be obvious and will in part appear hereinafter.

The invention accordingly comprises the several steps and the relation and order of one or more of such steps, with respect to each of the others thereof, which will be exemplified in the process hereinafter disclosed, and the scope of the application of which will be indicated in the claims.

Heretofore in the preparation of bread in bakeries it has been customary to take the dough from mixing machines at a temperature of 78° to 82° and during the "dough time" (that is, the time between the delivery of the dough from the mixing machines and its subdivision into loaves) the temperature of the dough in heretofore usual practice might occasionally increase up to as much as about 81° to 83° as an extreme upper limit, depending upon atmospheric temperature, without detrimental effect. If, however, in the heretofore known straight-dough methods the temperature of the dough was allowed to rise materially above these specified temperatures, souring of the dough and disintegration or breaking down of the gluten-forming constituents occur and therefore in ordinary bakery practice it has been considered practically essential to control the room temperature, by artificial refrigeration if necessary, to avoid the temperature of the dough itself rising above 83° F. to keep within safe limits.

According to the present invention, the dough ingredients may be mixed under such temperature conditions that the resulting dough batch attains a temperature of not less than 85° F., and even up to as high as 100° F., but preferably about 88° F., and the batch may be transferred directly to the divider for subdivision without allowing any "dough time" period, and without the necessity of materially increasing the amount of yeast used. The operations subsequent to division are carried out in the usual manner, the temperature of the dough during all of these operations being maintained continuously at not less than 84° F.

In the use of higher grade or "strong" flours, an initial temperature of the dough, approximating 90° F. or higher, and a "dough time" of substantially zero hours is feasible, even if only 2% to 3% of yeast, based on the weight of the flour, is used.

By "initial temperature" is meant the temperature of the dough batch at the time it is removed from the mixer. Since the initial temperature of the dough is up to the normal summer temperature of most localities in the United States (or higher in many instances) it may tend naturally (especially when employing the higher dough temperatures within the scope of the invention) to drop somewhat during the period involved and in any event the necessity of refrigeration of the dough is avoided.

One of the advantages of the present invention is that the increased temperature of the dough results in the possibility of obtaining, in the dough time involved, the same leavening effect in the dough with a much smaller quantity of yeast than would be required for that dough time, with the heretofore usual and supposedly necessary dough temperature.

Heretofore in the preparation of so-called "short time doughs" it has been necessary to use (for example for a one hour "dough time") three times the ordinary quantity of yeast which would have been required during a three hour dough period in order to produce in the short time allowed for leavening the desired leavening effect within the temperature limits previously considered essential. By the process of the present invention, however, it has been discovered that entirely satisfactory results may be obtained by adopting a "dough time" of not longer than one hour and by using not more than twice the quantity of yeast which would be required in the ordinary three hour "dough time" period of dough formation. Usually about three pounds of yeast have been heretofore employed per barrel of flour in a straight dough process (without resort to special yeast-saving additions) in commercial bakeries with a "dough time" of three hours, and a dough temperature of about 80° F., while in the present process, using substantially the same other dough ingredients but with a dough time of one hour and an initial dough temperature of about 85° F., it has been discovered that an equally good leavening of the dough is effected if double this quantity of yeast, viz: six pounds per barrel of flour is used in making up the dough. Thus a saving of one-third the quantity of yeast heretofore considered necessary in a one-hour "dough time" process, employing the same other ingredients, may be effected even when an initial dough temperature of 84° F. is adopted.

An especial advantage of the present invention, additional to the possible saving of yeast, is that by maintaining the dough at the temperatures, in accordance with the invention, above those previously usual, the expense of refrigeration systems for cooling the dough is avoided and the capacity for total output of a bakery of given size of apparatus is increased and the quality of bread produced is equal in all respects to that of the bread produced in the longer "dough time" processes heretofore practiced.

In the process of the present invention, it has been found to be usually highly advantageous, although not essential to the present invention, to employ as an auxiliary ingredient of the dough an acidified sacchariferous material of the type described and in the general manner described in United States Patent No. 1,355,127, dated Oct. 12, 1920, issued in my name and other non-injurious ingredients ordinarily used in usual bread-dough formulas may in general be included in the doughs without interfering with the effect of the present process employing the relatively high dough temperatures and a "dough-time," if any, which is relatively short. Preferably, if the dough is to be initially mixed, held and subdivided at temperatures approximating 90° F. or higher, the dough should be made with a flour of good quality with respect to its content (preferably relatively high) of gluten-forming constituents and mineral salts. However, a distinct advantage which resides in the process of the present invention is that wheat flours of quite different or various compositions, especially as regards the ratio of proteins to mineral matter in the flour, may be employed with substantially uniform and satisfactory results in bread making so that the variations in composition of the flour and in the ratio of the proteins to mineral matter in the flour do not require any changes of time or manipulation in the process of dough preparation and bread making by the baker.

Heretofore differences in the ratios of mineral matter to proteins in the flour employed for dough making have established or determined the fermentation time (usually called the "dough time") necessary for properly preparing a dough for baking by the straight dough process. For example a flour to be used in the manufacture of dough for bread making containing 12% of protein and .42% of ash, which is considered as a standard flour, will normally require a dough time of 3 hours when used with 1% of yeast, based on the weight of the flour and with a dough temperature of 80° F. In contrast to this a flour containing the same amount of protein (12%) but containing .50% ash with the same dough temperature and the same quantity of yeast will require ordinarily a fermenting period or dough time 15% longer, namely 207 minutes or an increase in dough time of 27 minutes due to the increase of only .08% in the ash of the flour.

Furthermore, in actual bakery practice by the straight dough process as heretofore employed, dough times or fermenting periods are affected also by other steps incidental to the process such as the punching down of doughs or in the ratio of the quantity of dough confined, to the cubic capacity of the dough carrying tray or trough. Also with dough times or fermenting periods of the lengths heretofore adopted the texture and general physical characteristics of the bread are affected as a result of the manipulations of the dough during the fermenting period or dough time.

In a straight dough bread process as heretofore practiced in which the so-called dough-time occupies a considerable lapse of time, for example three hours or even a shorter period, between the time that it comes from the mixing machines and the time that it is divided into loaves by a dividing machine or otherwise, the dough is very liable to injurious action by the mechanical treatment to which it is subjected, especially if extreme care be not taken to give the dough an exactly proper mechanical treatment at precisely the proper stage of the fermentation. This difficulty is avoided in the process of my present invention in accordance with which the dough time may be entirely eliminated.

It has been discovered that when, in accordance with the present invention, a dough temperature of 88° to 92° F. and a quantity of yeast amounting to 2 to 2½% of the weight of the flour are employed, flours may be employed which vary in their mineral constituents or ash from .42 to .60% with no substantial difference in the texture or general physical characteristics of the bread being apparent (such as might otherwise result from the manipulation of the dough during its usual fermenting period or dough time.)

It has heretofore been proposed that, for each different type of flour carrying different quantities of mineral matter in proportion to its protein content, the hydrogen ion concentration be adjusted to a standard as a basis for determining the proper fermentation time necessary to put the dough in condition ready for making bread. This proposed hydrogen ion concentration adjustment necessitates a consideration or determination of the buffer action of the salts in the particular flour which may be involved and requires that the hydrogen ion concentration be determined prior to dough formation. The present invention substantially eliminates the necessity for resorting to the use of such complex and intricate apparatus as is customarily or necessarily employed in making tests and adjustments of hydrogen ion concentrations.

Having thus described my invention, what I claim as new and desire to secure by Letters Patent, is:—

1. In a straight-dough process of making yeast-leavened bread, the improvement which comprises mixing the dough ingredients under controlled temperature conditions such that when completely mixed the resulting dough batch will have attained a temperature of not less than 85° F. nor more than 100° F. and substantially immediately subdividing the batch into loaves preparatory to introduction into the oven for baking.

2. In a straight-dough process of making yeast-leavened bread, the improvement which comprises mixing the dough ingredients under controlled temperature conditions such that when completely mixed the resulting dough batch will have attained a temperature of not less than 85° F. nor more than 100° F., maintaining the dough temperature thereafter without substantial drop, substantially immediately dividing the batch into loaves and introducing the same into the oven for baking.

3. In a straight-dough process of making yeast-leavened bread, the improvement which comprises mixing the dough ingredients under controlled temperature conditions such that when completely mixed the resulting dough batch will have attained a temperature of approximately 90° F., maintaining the dough temperature thereafter without substantial drop, substantially immediately subdividing the batch into loaves, proofing, and introducing the same into the oven for baking.

4. In a straight dough process of making yeast-leavened bread, the improvement which comprises mixing together wheat flour, yeast, water and other auxiliary bread-dough ingredients until a dough-temperature is attained such that without "dough-time" fermentation the dough will yield a bread loaf of good volume, crust, and texture of crumb; substantially immediately subdividing the batch into loaves, thereafter proofing for the usual short time, and baking.

In witness whereof, I have hereunto signed my name to this specification on the 27th day of March, 1923.

ROBERT L. CORBY.